United States Patent
Tokuhashi

Patent Number: 6,151,061
Date of Patent: Nov. 21, 2000

[54] BIOCULAR IMAGE DISPLAY APPARATUS

[75] Inventor: Yuki Tokuhashi, Hachioji, Japan

[73] Assignee: Olympus Optical Co., Ltd., Tokyo, Japan

[21] Appl. No.: 08/919,118

[22] Filed: Aug. 28, 1997

[30] Foreign Application Priority Data

Aug. 29, 1996 [JP] Japan .................................... 8-227986

[51] Int. Cl.$^7$ ................................................. H04N 13/04
[52] U.S. Cl. ................................. 348/51; 345/8; 359/466
[58] Field of Search ................................. 348/51, 53, 54, 348/42, 56, 36, 39; 351/201; 359/462, 464, 466, 742, 630, 637; 345/8, 425, 6, 32, 302

[56] References Cited

U.S. PATENT DOCUMENTS

| | | | |
|---|---|---|---|
| 5,274,405 | 12/1993 | Webster | 351/201 |
| 5,495,576 | 2/1996 | Ritchey | 345/425 |
| 5,621,424 | 4/1997 | Shimada et al. | 348/56 |
| 5,798,739 | 8/1998 | Tietel | 345/8 |
| 5,825,456 | 10/1998 | Tabata et al. | 348/51 |
| 5,847,870 | 12/1998 | Ohtsuka | 359/462 |

FOREIGN PATENT DOCUMENTS

| | | |
|---|---|---|
| 2-281891 | 11/1990 | Japan . |
| 4-108288 | 4/1992 | Japan . |
| 6-123852 | 5/1994 | Japan . |

Primary Examiner—Vu Le
Assistant Examiner—Gims Philippe
Attorney, Agent, or Firm—Pillsbury Madison & Sutro LLP

[57] ABSTRACT

A biocular image display apparatus in which the observer's left and right visual lines intersect at a position where the image as observed appears to be natural to the observer even in a corner of the image field, thereby enabling the observer to make observation with ease and without feeling incongruous even at a wide field angle. The apparatus has left and right display surfaces and left and right optical systems associated with the display surfaces, respectively, wherein enlarged images of the left and right display surfaces are observed through the left and right optical systems. The apparatus has a diopter setting mechanism (11), an interpupillary distance setting mechanism (12), and a vergence mechanism (13) that tilts the left and right optical systems, together with the left and right display surfaces, respectively, as one unit so that the optical axes of the left and right optical systems form a predetermined angle according to the set diopter and interpupillary distance values. The apparatus further has image distorting devices (14 and 15) whereby the display position of any display point on each display surface is changed to a position determined by the coordinates of the display point on the display surface, the diopter value set by the diopter setting mechanism (11), and the interpupillary distance value set by the interpupillary distance setting mechanism (12).

8 Claims, 9 Drawing Sheets

BIOCULAR IMAGE DISPLAY APPARATUS

BACKGROUND OF THE INVENTION

1. Field of the Invention

The present invention relates to a biocular image display apparatus. More particularly, the present invention relates to a head-mounted image display apparatus having the function of tilting a pair of optical systems, together with a pair of image display devices associated therewith, respectively, as one unit in order to match the diopter and the vergence angle with each other. The apparatus is designed to enable an observer to make observation easily without feeling incongruous even at a wide field angle.

2. Discussion of Related Art

One example of conventional biocular image display apparatuses, represented by head-mounted image display apparatuses, will be described with reference to FIG. 10 of the accompanying drawings. This apparatus has a pair of left and right image display units 1L and 1R and a pair of optical systems 2L and 2R associated therewith, respectively. An observer views enlarged virtual images 4L and 4R of the image display surfaces of the image display units 1L and 1R with his/her left and right eyes $E_L$ and $E_R$. Even if the positions of the left and right virtual images 4L and 4R are not geometrically coincident with each other, the observer can see (fuse) the two images 4L and 4R as a single image by making them coincident with each other in his/her brain. In the example shown in FIG. 10, however, the optical systems 2L and 2R, together with the image display units 1L and 1R, are tilted inwardly toward each other so that the central portions of the virtual images 4L and 4R of the left and right image display surfaces are approximately coincident with each other geometrically.

In general, when an observer looks at an object in daily life, his/her left and right visual lines (i.e. lines of sight) 5L and 5R intersect at the fixation point (this will hereinafter be referred to as "vergence"), and thus the eyes $E_L$ and $E_R$ are focused on the fixation point. When the observer shifts the fixation point further away from or nearer to him or her, the vergence condition of the visual lines 5L and 5R and the focusing of the eyes $E_L$ and $E_R$ change in accordance with the shift of the fixation point.

When the observer gazes at a certain point on the image field of the biocular image display apparatus, the observer's eyes $E_L$ and $E_R$ are focused on the respective positions of the virtual images of the left and right image display surfaces. Consequently, the observer's visual lines 5L and 5R are directed to the corresponding points on the virtual images 4L and 4R of the left and right image display surfaces. In the example shown in FIG. 10, the apparatus is arranged such that the central portions of the virtual images 4L and 4R of the left and right image display surfaces are approximately coincident with each other geometrically. Therefore, in an area of small field angle (i.e. the hatched portion in the figure), the visual lines 5L and 5R intersect (converge) substantially on the virtual images 4L and 4R. Accordingly, the condition of observation is close to that in daily life.

However, in an area of large field angle (i.e. the area on each side of the hatched portion in the figure), the displacement between the corresponding image points becomes large. The visual lines 5L' and 5R' formed when the observer views an edge of each image display surface converge considerably nearer to him or her than in a case where the observer looks at the center of each image display surface. Consequently, it appears to the observer that both of the edges of the image field lie undesirably close to him or her as shown by the curve 6 in FIG. 10. If the imbalance between the focusing and vergence of the eyes $E_L$ and $E_R$ increases, the observer feels discomfort or incongruity. Moreover, it becomes difficult to fuse the left and right images. In such a case, the image to be observed may look double or appear to be flickering.

When the observer looks obliquely upwards as shown in FIG. 11, the left and right visual lines 5L" and 5R" do not intersect but are vertically displaced relative to each other. As the vertical displacement increases, it becomes difficult to fuse the left and right images, and the observer feels difficulty in viewing. When the observer views only the displayed image, he or she can hardly notice the displacement as long as it is small. However, when the apparatus is used in the superimpose mode, in which the image for observation is superimposed on an external scene, or in the see-around mode, in which an external scene is seen in the immediate neighborhood of the observation image, it is likely that either the observation image or the external scene will become difficult to fuse.

SUMMARY OF THE INVENTION

In view of the above-described problems associated with the prior art, an object of the present invention is to provide an image display apparatus having the function of tilting a pair of optical systems, together with a pair of image display devices associated therewith, respectively, as one unit in order to match the diopter and the vergence angle with each other, which is designed so that the observer's left and right visual lines intersect each other at a position where the image as observed appears to be natural to the observer even in a corner of the image field, thereby enabling the observer to make observation with ease and without feeling incongruous even when the field angle is large.

To attain the above-described object, the present invention provides a biocular image display apparatus having a left image display surface for a left eye; a right image display surface for a right eye; a left optical system through which an observer's left eye observes an image displayed by the left image display surface as a virtual image for the left eye; and a right optical system through which an observer's right eye observes an image displayed by the right image display surface as a virtual image for the right eye. The apparatus has an image distorting device that causes the left and right image display surfaces to display the left and right images distorted so that when the observer views the left and right virtual images as a single image by fusing the two images in his/her brain, the observer's left and right visual lines can intersect substantially in an ideal virtual image plane, which is a virtual image position ideal for the observer's visual perception.

Thus, noting that the left virtual image formed by the image displayed on the left image display surface and the right virtual image formed by the image displayed on the right image display surface are fused at a position deviating from the virtual image position ideal for the observer's visual perception, the present invention corrects the deviation by distorting the images displayed on the left and right image display surfaces. With this arrangement, the present invention enables the observer's left and right visual lines to intersect substantially at an ideal position where the image as observed appears to be natural to the observer no matter which parts of the left and right virtual images the observer's left and right eyeballs see, i.e. the left-hand side, the right-hand side or the center of each of the left and right virtual images. With this action, the present invention prevents the left and right virtual images from becoming difficult to fuse and enables the observer to perform observation without feeling incongruity or discomfort.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 6:
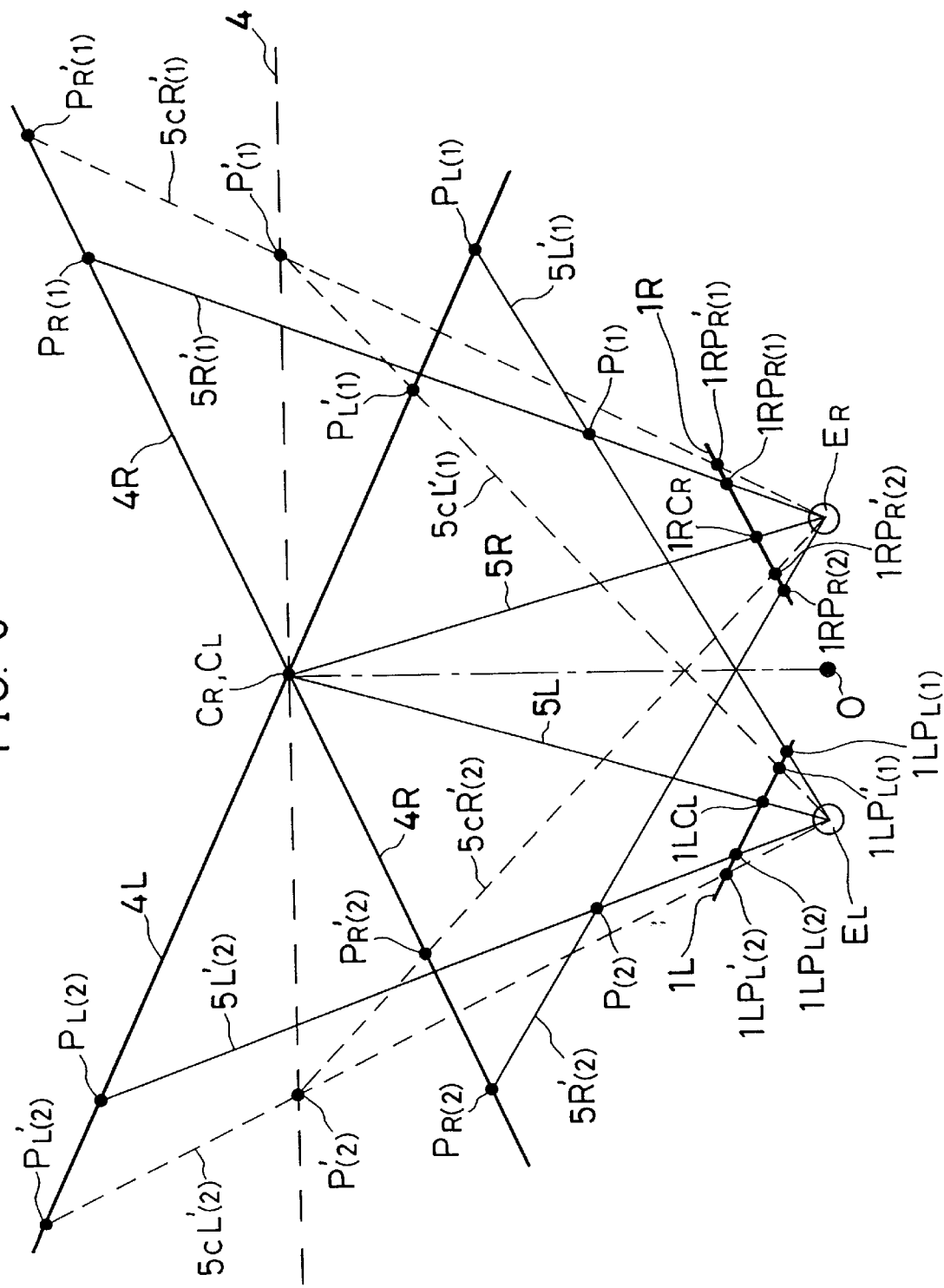
FIG. 6 is a diagram for describing the principle of the arrangement of the biocular image display apparatus according to the present invention.

In a more specific arrangement of the present invention, the image distorting device is preferably arranged as stated below. The principle of each arrangement will be described below with reference to FIG. 6. In FIG. 6, the illustration of the left and right optical systems is omitted for explanatory simplicity.

Observer's left and right eyes $E_L$ and $E_R$ observe left and right image display surfaces 1L and 1R through respective optical systems (not shown). Consequently, images displayed on the image display surfaces 1L and 1R are projected as enlarged images by the optical systems, thereby forming left and right virtual image planes 4L and 4R. Observer's visual lines 5L and 5R formed when the observer sees images 1LCL and 1RCR in approximately central portions of the image display surfaces 1L and 1R intersect at a point $C_L$ ($C_R$) in the virtual image planes 4L and 4R. When the observer sees the central portion of each image display surface, a plane 4 that contains the point of intersection ($C_L$, $C_R$) between the left and right visual lines and that is approximately parallel to a plane containing the left and right eyeballs $E_L$ and $E_R$ is the most ideal plane for the observer to view the fused image. However, the human sense of sight has an allowable range in which even if the plane is curved or displaced nearer to or further away from the observer, the fused image looks to be approximately the same as that seen when the observer views the most ideal plane. Therefore, the most ideal plane for observing the fused image and planes that fall within the above-described visually allowable range are herein defined generally as "ideal virtual image planes".

Let us examine a situation in which one of the observer's left and right eyes $E_L$ and $E_R$ sees the outer end of the image display surface 1L or 1R corresponding to the eye concerned (i.e. in the case of the left eye, the left-hand end of the image display surface 1L; in the case of the right eye, the right-hand end of the image display surface 1R). At this time, the observer's left eye $E_L$ observes a virtual image point $P_L(2)$ of the virtual image 4L through an image point $1LP_L(2)$ on the image display surface 1L.

However, the point of fusion perceived by the observer by viewing the virtual image point $P_L(2)$ with the left eye and the corresponding right virtual image point with the right eye is formed at a position deviating to a considerable extent from the ideal virtual image plane 4. Therefore, it is necessary to distort the displayed image so that the image point $1LP_L(2)$ displayed on the left image display surface 1L moves to an image point $1LP_L'(2)$ and hence the point of fusion shifts to a fusion point P'(2) in the ideal virtual image plane 4. Accordingly, the image distorting device used in the present invention is preferably arranged to include a device for distorting the image displayed on the left image display surface so that the virtual image $P_L(2)$ at the left-hand edge of the virtual image plane 4L for the left eye is fused as an image P'(2) in the ideal virtual image plane 4.

The same is the case with the right eye. That is, the observer's right eye $E_R$ observes a virtual image point $P_R(1)$ of the virtual image 4R through an image point $1RP_R(1)$ on the image display surface 1R. However, the point of fusion perceived by the observer by viewing the virtual image point $P_R(1)$ with the right eye and the corresponding left virtual image point with the left eye is formed at a position deviating to a considerable extent from the ideal virtual image plane 4. Therefore, it is necessary to distort the displayed image so that the image point $1RP_R(1)$ displayed on the right image display surface 1R moves to an image point $1RP_R'(1)$ and hence the point of fusion shifts to a fusion point P'(1) in the ideal virtual image plane 4. Accordingly, the image distorting device used in the present invention is preferably arranged to include a device for distorting the image displayed on the right image display surface so that the virtual image $P_R(1)$ at the right-hand edge of the virtual image plane 4R for the right eye is fused as an image P'(1) in the ideal virtual image plane 4.

Let us examine a situation in which one of the observer's left and right eyes $E_L$ and $E_R$ sees the inner end of the image display surface 1L or 1R corresponding to the eye concerned (i.e. in the case of the left eye, the right-hand end of the image display surface 1L; in the case of the right eye, the left-hand end of the image display surface 1R). At this time, the observer's left eye $E_L$ observes a virtual image point $P_L(1)$ of the virtual image 4L through an image point $1LP_L(1)$ on the image display surface 1L. However, the point of fusion perceived by the observer by viewing the virtual image point $P_L(1)$ with the left eye and the corresponding right virtual image point with the right eye is formed at a position deviating to a considerable extent from the ideal virtual image plane 4. Therefore, it is necessary to distort the displayed image so that the image point $1LP_L(1)$ displayed on the left image display surface 1L moves to an image point $1LP_L'(1)$ and hence the point of fusion shifts to a fusion point P'(1) in the ideal virtual image plane 4. Accordingly, the image distorting device used in the present invention is preferably arranged to include a device for distorting the image displayed on the left image display surface so that the virtual image $P_L(1)$ at the right-hand edge of the virtual image plane 4L for the left eye is fused as an image P'(1) in the ideal virtual image plane 4.

The same is the case with the right eye. That is, the observer's right eye $E_R$ observes a virtual image point $P_R(2)$ of the virtual image 4R through an image point $1RP_R(2)$ on the image display surface 1R. However, the point of fusion perceived by the observer by viewing the virtual image point $P_R(2)$ with the right eye and the corresponding left virtual image point with the left eye is formed at a position deviating to a considerable extent from the ideal virtual image plane 4. Therefore, it is necessary to distort the displayed image so that the image point $1RP_R(2)$ displayed on the right image display surface 1R moves to an image point $1RP_R'(2)$ and hence the point of fusion shifts to a fusion point P'(2) in the ideal virtual image plane 4. Accordingly, the image distorting device used in the present invention is preferably arranged to include a device for distorting the image displayed on the right image display surface so that the virtual image $P_R(2)$ at the left-hand edge of the virtual image plane 4R for the right eye is fused as an image P'(2) in the ideal virtual image plane 4.

Next, let us examine the relationship between the observer's left and right visual lines and the point of fusion. When the left and right eyes $E_L$ and $E_R$ see the virtual images $P_L(1)$ and $P_R(1)$ through the images $1LP_L(1)$ and $1RP_R(1)$ at the right-hand edges of the image display surfaces 1L and 1R, the visual lines 5L'(1) and 5R'(1) intersect at a point P(1). The observer views the virtual image $P_L(1)$ with the left eye $E_L$ and the virtual image $P_R(1)$ with the right eye $E_R$ and perceives the fused image at the position of the intersection point P(1). Similarly, when the left and right eyes $E_L$ and $E_R$ see the virtual images $P_L(2)$ and $P_R(2)$ through the images $1LP_L(2)$ and $1RP_R(2)$ at the left-hand edges of the image display surfaces 1L and 1R, the observer perceives the fused image at the position of a point P(2) where the left and right visual lines 5L'(2) and 5R'(2) intersect each other. Therefore, it is necessary to shift the fusion points P(2) and P(1), which deviate to a considerable extent from the ideal virtual image plane 4, to the points P'(2) and P'(1) in the ideal virtual image plane 4. If the visual lines 5L'(1) and 5R'(1) [5L'(2) and 5R'(2)] of the left and right eyes $E_L$ and $E_R$ are shifted to the visual lines 5cL'(1) and 5cR'(1) [5cL'(2) and 5cR'(2)] so that the intersection point P(1) [P(2)] of the visual lines moves to the point P'(1) [P'(2)] in the ideal virtual image plane 4, the fusion point perceived by the observer is coincident with the ideal virtual image plane 4, and the observer can perform natural observation without feeling incongruous. Accordingly, the image distorting device used in the present invention is preferably arranged to include a device for distorting images displayed on the right and left image display surfaces so that both the point P(1) of intersection between the right and left visual lines 5R'(1) and 5L'(1) formed when the observer sees the virtual images $P_R(1)$ and $P_L(1)$ through the images $1RP_R(1)$ and $1LP_L(1)$ displayed at the right-hand edges of the right and left image display surfaces and the point P(2) of intersection between the right and left visual lines 5R'(2) and 5L'(2) formed when the observer sees the virtual images $P_R(2)$ and $P_L(2)$ through the images $1RP_R(2)$ and $1LP_L(2)$ displayed at the left-hand edges of the right and left image display surfaces shift to the ideal virtual image plane 4 containing the point $C_R$ ($C_L$) of intersection between the right and left visual lines 5R and 5L formed when the observer sees the virtual images through the images $1RC_R$ and $1LC_L$ displayed in the central portions of the right and left image display surfaces.

The above-described image distorting device can shift the deviating fusion position to the ideal virtual image plane 4 by compressing or expanding the images displayed on the left and right image display surfaces 1L and 1R. Accordingly, the image distorting device used in the present invention is preferably arranged to distort the images displayed on the left and right image display surfaces 1L and 1R by compression or expansion such that the left-hand marginal image $1LP_L(2)$ displayed on the left image display surface 1L moves outwardly to the leftward image position $1LP_L'(2)$, and/or the right-hand marginal image $1LP_L(1)$ displayed on the left image display surface 1L moves inwardly to the leftward image position $1LP_L'(1)$, and/or the right-hand marginal image $1RP_R(1)$ displayed on the right image display surface 1R moves outwardly to the rightward image position $1RP_R'(1)$, and/or the left-hand marginal image $1RP_R(2)$ displayed on the right image display surface 1R moves inwardly to the rightward image position $1RP_R'(2)$.

In this case, it is preferable to form the biocular image display apparatus such that the optical axis of the left optical system and the optical axis of the right optical system intersect at a predetermined angle according to the diopter value and the interpupillary distance value.

Further, it is preferable to form the image distorting device such that the expansion or compression of each image is effected by changing coordinates defining the position of each image point displayed on the image display surface, and that the change of the coordinates is decided from the coordinates of each image point position, the number of pixels of the image display surface, the field angle of the biocular image display apparatus, and the angle of intersection between the optical axes of the left and right optical systems.

The biocular image display apparatus preferably has a vergence device having the function of tilting the left and right image display surfaces, together with the left and right optical systems, respectively, as one unit such that the optical axes of the left and right optical systems intersect at a predetermined angle according to the diopter value and the interpupillary distance value.

The image distorting device may have a device whereby the images displayed by the left and right image display surfaces are distorted also in the vertical direction.

The foregoing biocular image display apparatus according to the present invention is adapted to tilt the left and right optical systems, together with the left and right image display units, respectively, as one unit such that the optical axes of the left and right optical systems intersect at a predetermined angle according to the set diopter and interpupillary distance values when the observer views enlarged images of the image display surfaces of the left and right image display units through the left and right optical systems. In the biocular image display apparatus, the corresponding image points displayed on the left and right image display surfaces are shifted so that the left and right visual lines intersect each other substantially at a predetermined position, thereby minimizing the vertical displacement of the visual lines and the imbalance between the focusing and vergence of the eyes. Each image is distorted by compression and expansion such that the closer to the right (left) end of the right (left) image display surface, the larger amount of outward shift is given, and the closer to the left (right) end of the right (left) image display surface, the larger amount of inward shift is given so that even when the observer sees an end of each image display surface, the visual lines intersect at a depth approximately equal to that in the case of observing the center of each image display surface. The amount of shift is determined according to the coordinates of each display point and the set diopter and interpupillary distance values.

Figure 1:
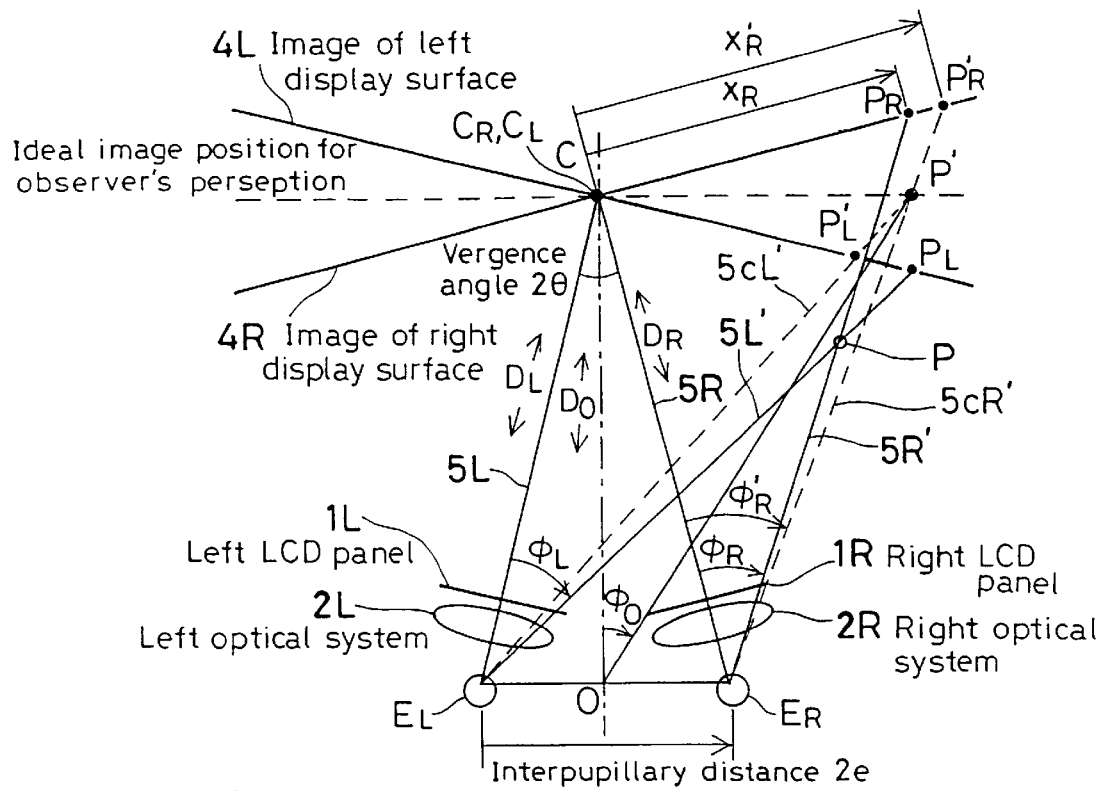
FIG. 1 is a diagram for describing the operation of a first embodiment of the biocular image display apparatus according to the present invention.

First of all, a first embodiment of the present invention will be described below with reference to FIG. 1. In FIG. 1, when images displayed on left and right LCD panels 1L and 1R are observed through left and right optical systems 2L and 2R, the optical systems 2L and 2R, together with the LCD panels 1L and 1R, are tilted inwardly toward each other in their entireties so that the centers $C_R$ and $C_L$ of the images 4L and 4R of the left and right image display surfaces are approximately coincident with each other. The interpupillary distance $2e$ has been adjusted to the distance between the observer's left and right eyes $E_L$ and $E_R$. Therefore, the left and right visual lines 5L and 5R formed when the observer sees the center of each image display surface, i.e. the line connecting the left eye $E_L$ and the center $C_L$ of the image 4L of the left image display surface and the line connecting the right eye $E_R$ and the center $C_R$ of the image 4R of the right image display surface, intersect at the position C of distance $D_O$ from the interpupillary center O. At this time, the relationship between the distances $D_L$ and $D_R$ from the left and right eyes $E_L$ and $E_R$ to the images and the vergence angle $2\theta$ is approximately the same as in the case of viewing the actual screen or the like.

However, because the image planes 4L and 4R of the left and right image display surfaces intersect each other, when the observer sees an end portion of each display surface image, the corresponding points $P_L$ and $P_R$ of the left and right images are apart from each other toward and away from the observer as shown in FIG. 1. Consequently, the left and right visual lines 5L' and 5R' undesirably intersect at a point P closer to the observer than the image planes.

To avoid the above phenomenon, the points $P_L$ and $P_R$ are shifted to an inner point $P_L'$ and an outer point $P_R'$, respectively, so that the left and right visual lines 5cL' and 5cR' intersect at a point P' in a plane at the eye-image distance $D_O$. The position of P' is set such that the viewing angle $\phi_O$ as seen from the interpupillary center O is equal to the viewing angles $\phi_L$ and $\phi_R$ as seen from the left and right eyes $E_L$ and $E_R$ so that the apparent viewing angle sensed by the observer will not change when he or she sees with one eye.

It should be noted that the angle between the visual line 5L (5R) formed when the observer sees the center of the display surface image and the visual line formed when he or she sees a marginal point, e.g. $\angle(C_R E_R P_R)$, is herein referred to as "the viewing angle of the point $P_R$". Further, the angle formed when the left and right eyes $E_L$ and $E_R$ see the center of the display surface images, i.e. $\angle(E_L C E_R)$, is herein referred to as "the center vergence angle $2\theta$". Regarding signs, the direction from the left eye $E_L$ toward the right eye $E_R$ is defined as the positive direction of the horizontal direction, and the direction from the interpupillary center O toward the position C is defined as the positive direction of the longitudinal direction, which is perpendicular to the horizontal direction.

First, regarding the right image display surface, assuming that $x_R$ is the horizontal distance on the display surface image 4R from the center $C_R$ to the point $P_R$, and $x_R'$ is the horizontal distance on the display surface image 4R from the center $C_R$ to the point $P_R'$, the following expressions hold:

$$x_R = D_R \tan \phi_R \qquad (1)$$

$$x_R' = D_R \tan \phi_R' \qquad (2)$$

In the above expressions, $\phi_R'$ is the viewing angle formed when the observer sees the point $P_R'$ after the shift with the right eye $E_R$. Assuming that the distance between C and P' is $x_O$, the viewing angle $\phi_R'$ is given by $$\phi_R' = \theta + \tan^{-1}\{(x_O - e)/D_O\}$$
$$= \theta + \tan^{-1}(\tan\phi_O - \tan\theta)$$

Because $\phi_O$ and $\phi_R$ are set so as to be equal to each other, the viewing angle $\phi_R'$ is given by $$\phi_R' = \theta + \tan^{-1}(\tan \phi_R - \tan \theta) \qquad (3)$$

Accordingly, when the point $P_R$ is shifted to $P_R'$ on the display surface image 4R, the amount of horizontal shift $\Delta x_R$ is given by $$\Delta x_R = x_R' - x_R \qquad (4)$$
$$= D_R \tan\{\theta + \tan^{-1}(\tan\phi_R - \tan\theta)\} - x_R$$
$$= x_R\{1/(1 - \tan\theta\tan\phi_R + \tan^2\theta) - 1\}$$
$$= x_R[1/\{1 - (x_R/D_R)\tan\theta + \tan^2\theta\} - 1]$$

where:

$$\tan \theta = e/D_O = e/\sqrt{(D_R^2 - e^2)} \qquad (5)$$

Regarding the left image display surface, the viewing angle $\phi_L'$ formed when the observer sees the point $P_L'$ after the shift with the left eye $E_L$ is given by $$\phi_L' = -\theta + \tan^{-1}(\tan \phi_L + \tan \theta)$$

Therefore, assuming that the distance between C and $P_L$ is $x_L$ and the distance between C and $P_L'$ is $x_L'$, the amount of horizontal shift $\Delta x_L$ is given by $$\Delta x_L = x_L' - x_L \qquad (6)$$
$$= x_L[1/\{1 - (x_L/D_L)\tan\theta + \tan^2\theta\} - 1]$$

Figure 2:
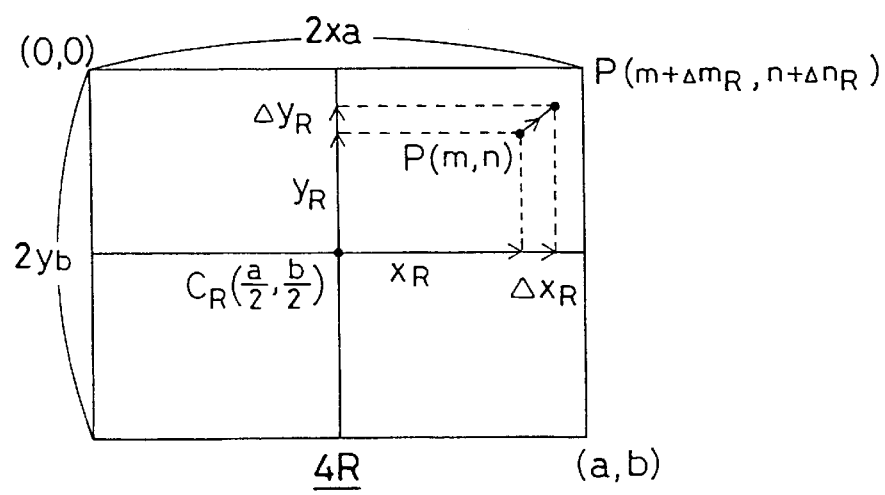
FIG. 2 is a diagram for describing the relationship between the coordinates of a point on an image of an LCD image display surface and the horizontal and vertical distances.

Here, the coordinates of points on the image display surface of the right LCD 1R are taken such that the coordinates of the upper-left point are (0,0), and the coordinates of the lower-right point are (a,b). As shown in FIG. 2, the coordinates of points on the display surface image 4R are taken in the same way as in the case of the image display surface of the right LCD 1R. The coordinates of the image center $C_R$ are (a/2,b/2). When the point P whose coordinates are (m,n) is shifted to the point P' whose coordinates are $(m_R', n_R')$, the amounts of coordinate shift $\Delta m_R$ and $\Delta n_R$ and the amounts of shift $\Delta x_R$ and $\Delta y_R$ on the display surface image are related to each other as follows:

$$\Delta m_R = a(\Delta x_R/2x_a) \qquad (7a)$$

$$\Delta n_R = -b(\Delta y_R/2y_b) \qquad (7b)$$

where $2x_a$ is the overall horizontal length of the display surface image 4R, and $2y_b$ is the overall vertical length of the display surface image 4R.

Assuming that $2\phi_a$ is the angle (overall field angle) between the visual line formed when the observer sees one horizontal end of the display surface image 4R and that formed when he or she sees the other horizontal end, and $2\psi_b$ is the angle (overall field angle) between the visual line formed when the observer sees one vertical end of the display surface image 4R and that formed when he or she sees the other vertical end, the following expressions hold:

$$x_a = D_R \tan \phi_a \quad (8a)$$

$$y_b = D_R \tan \psi_b \quad (8b)$$

$\phi_a$ and $\psi_b$ are determined by the size of the display surface of the LCD 1R and the magnification of the optical system 2R, and $D_R$ is determined by the set value of diopter. Moreover, the horizontal distance $x_R$ and vertical distance $y_R$ of the point P on the display surface image 4R from the image center $C_R$ are expressed by the coordinates of the point P as follows:

$$x_R = 2x_a(m/a - \tfrac{1}{2}) \quad (9a)$$

$$y_R = 2y_b(\tfrac{1}{2} - n/b) \quad (9b)$$

Therefore, for any point P(m,n) on the image display surface of the LCD, an amount of horizontal coordinate shift $\Delta m_R$ corresponding to the set diopter and interpupillary distance values is determined from Eqs.(4), (5), (7a), (8a) and (9a) as follows:

$$\Delta m_R = (m - a/2)[1/\{1 + \tan^2 \theta - 2 \tan \theta \tan \phi_a(m/a - \tfrac{1}{2})\} - 1] \quad (10)$$

where:

$$\tan \theta = e/\sqrt{(D_R^2 - e^2)}$$

For the left image display surface also, an amount of horizontal coordinate shift $\Delta m_L$ is similarly determined from Eqs.(5), (6), (7a), (8a) and (9a) simply by replacing the suffix R added to Eqs.(7a), (8a) and (9a) with L.

Thus, it is possible to avoid the intersection of the left and right visual lines at a position closer to the observer than the image planes by executing the processing of distorting the left and right images according to the diopter and the interpupillary distance.

Figure 3:
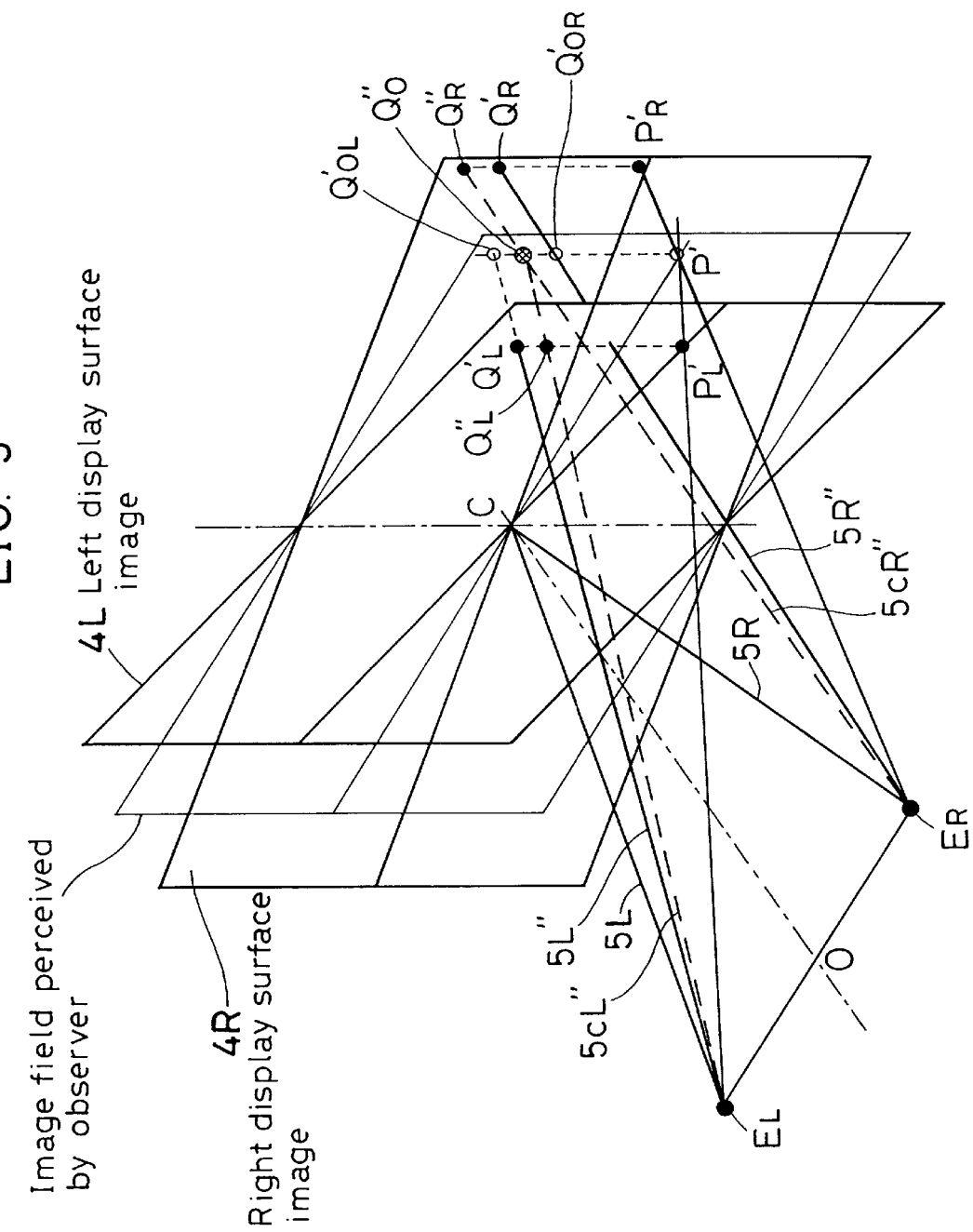
FIG. 3 is a diagram for describing the operation of a second embodiment of the biocular image display apparatus according to the present invention.

Next, a second embodiment of the present invention will be described. In the first embodiment, the point of fusion is shifted only in the horizontal direction; in the second embodiment, the vertical field angle is large, and the fusion point is shifted also in the vertical direction. FIG. 3 shows the way in which the observer sees the corresponding points $Q_L'$ and $Q_R'$ in the upper-right corners of the left and right display surface images. Let us assume that a plane containing the left and right eyes $E_L$ and $E_R$ and the image center C is a horizontal reference plane, and points in the horizontal reference plane at respective positions horizontally coincident with the corresponding points $Q_L'$ and $Q_R'$ on the display surface images are denoted by $P_L'$ and $P_R'$, respectively.

Let us assume that in the horizontal direction the shift processing according to the first embodiment has already been executed. Accordingly, the projections of the left and right visual lines onto the horizontal reference plane (i.e. the horizontal components of the left and right visual lines) intersect at the point P'. This condition is similar to that in FIG. 1. However, the visual lines 5L" and 5R" directed to $Q_L'$ and $Q_R'$ pass through different points $Q_{OL}'$ and $Q_{OR}'$ in the vertical line to the point P' and do not intersect each other. If the vertical displacement is small, the two images can be fused, but when the apparatus is used in the superimpose mode, in which the image for observation is superimposed on an external scene, or in the see-around mode, in which an external scene is seen in the immediate neighborhood of the observation image, it is likely that either the observation image or the external scene will become difficult to fuse.

To avoid the displacement between the left and right visual lines, $Q_L'$ is shifted downwardly to a point $Q_L''$, while $Q_R'$ is shifted upwardly to a point $Q_R''$ so that the left and right visual lines 5cL" and 5cR" intersect at the point $Q_O''$ in the vertical line to P'. $Q_O''$ is set at such a point that the height $y_O$ from the horizontal reference plane is equal to $y_L$ and $y_R$ [see FIGS. 4(a) and 4(b)].

Figures 4A, 4B:
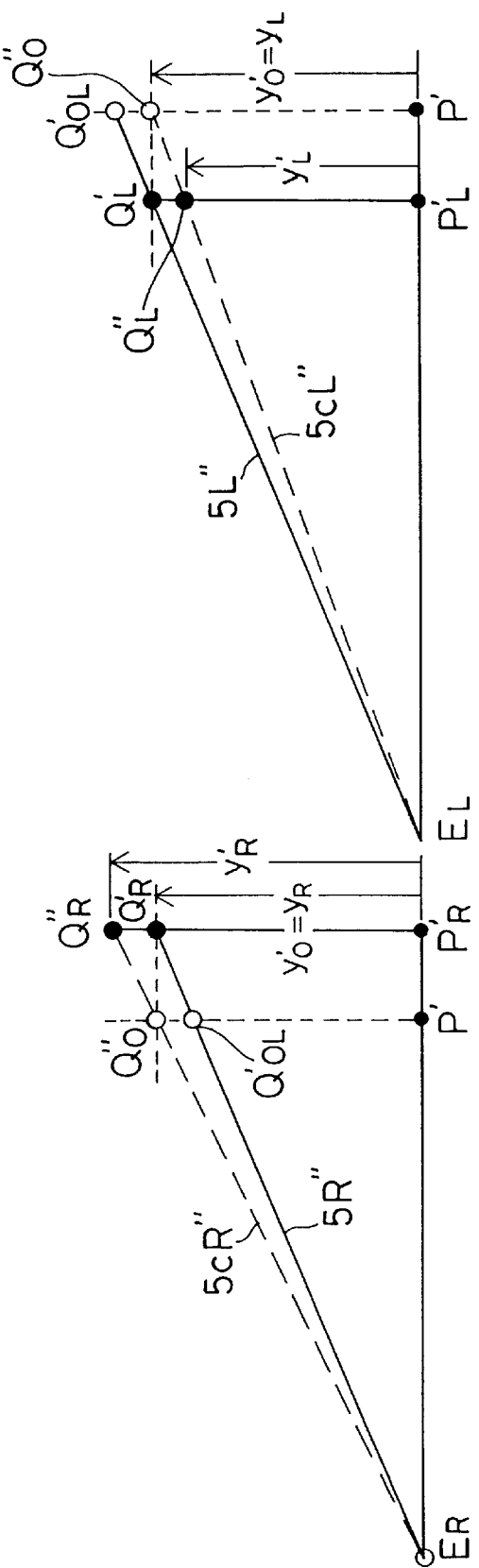
FIGS. 4(a) and 4(b) are diagrams for describing a shift in the vertical direction in FIG. 3.

FIG. 4(a) is a diagram showing FIG. 3 as seen from a direction perpendicular to a plane containing the right eye $E_R$ and the points $Q_R'$ and $P_R'$ on the display surface image 4R. FIG. 4(b) is a diagram showing FIG. 3 as seen from a direction perpendicular to a plane containing the left eye $E_L$ and the points $Q_L'$ and $P_L'$ on the display surface image 4L.

Referring to FIG. 4(a), the point $Q_R'$ on the display surface image 4R is shifted to $Q_R''$ so that the visual line 5cR" extending from the right eye $E_R$ to the point $Q_R''$ passes through a point $Q_O''$ at the height $y_O' = y_R$ from the point P' in the horizontal reference plane.

Assuming that the height of the point $Q_R'$ is $y_R$ and the height of the point $Q_R''$ after the shift is $y_R'$, the following relationship holds:

$$y_R = (E_R P_R' / E_R P') y_R \quad (11)$$

As will be understood from FIG. 1, the distance between $E_R$ and P' and the distance between $E_R$ and $P_R'$ are given by $$E_R P' = D_R \cos \theta / \cos (\phi_R' - \theta)$$

$$E_R P_R' = D_R / \cos \phi_R'$$

Therefore, the amount of vertical shift $\Delta y_R$ is given by $$\Delta y_R = y_R' - y_R = y_R \tan \theta \tan \phi_R' \quad (12)$$

where $\phi_R'$ is the horizontal component of the visual line directed to the point $Q_R'$ after the horizontal shift. From FIG. 1 and Eq. (9a), $\phi_R'$ is given by $$\tan \phi_R' = x_R'/D_R = 2 \tan \phi_a \{(m + \Delta m_R)/a - \tfrac{1}{2}\} \quad (13)$$

Conversion into an amount of vertical coordinate shift $\Delta n_R$ on the display surface of the LCD can be effected as in the case of the first embodiment from Eqs.(7b), (8b) and (9b) as follows:

$$\Delta n_R = 2b(n/b - \tfrac{1}{2})\{(m + \Delta m_R)/a - \tfrac{1}{2}\} \tan \phi_a \tan \theta \quad (14)$$

Regarding the point $Q_L'$ on the left display surface image 4L, the amount of vertical shift $\Delta y_L$ is determined as in the case of the right display surface from FIGS. 1 and 4(b) as follows:

$$\Delta y_L = y_L' - y_L = -y_L \tan \phi \tan \phi_L' \quad (15)$$

where:

$$\tan \phi_L' = x_L'/D_L = 2 \tan \phi_a\{(m + \Delta m_L)/a - \tfrac{1}{2}\} \quad (16)$$

The amount of vertical coordinate shift $\Delta n_L$ on the display surface of the left LCD is given by $$\Delta n_L = -2b(n/b-\tfrac{1}{2})\{(m+\Delta m_L)/a-\tfrac{1}{2}\}\tan\phi_a \tan\theta \qquad (17)$$

Thus, the left and right visual lines are allowed to intersect at a predetermined position without deviating from each other vertically.

Figure 5:
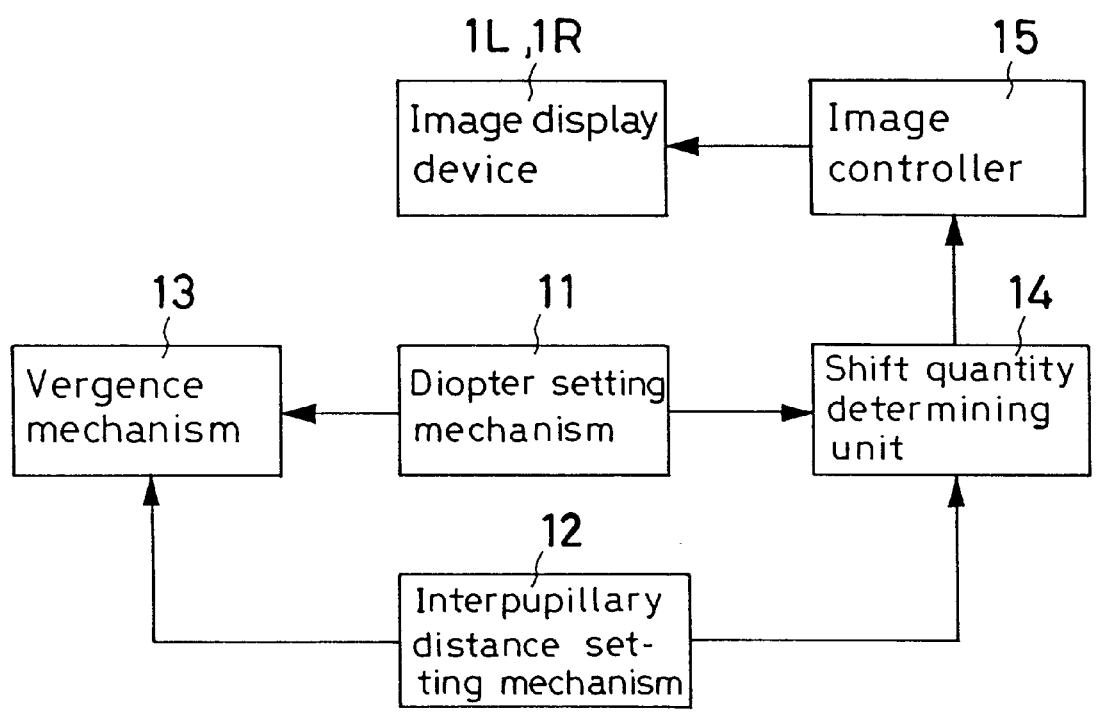
FIG. 5 is a block diagram schematically showing the whole arrangement of a control system for displaying a distorted image according to the present invention.

FIG. 5 is a block diagram schematically showing the whole arrangement of a control system for displaying distorted images on the LCD panels 1L and 1R according to the first or second embodiment. A diopter and interpupillary distance of the image display apparatus are set by a diopter setting mechanism 11 and an interpupillary distance setting mechanism 12. A vergence angle is determined by the diopter value and the interpupillary distance value, which are set by the diopter setting mechanism 11 and the interpupillary distance setting mechanism 12, respectively. A vergence mechanism 13 tilts the optical systems 2L and 2R, together with the image display devices (LCD panels) 1L and 1R, inwardly toward each other in their entireties. A shift quantity determining unit 14 determines a coordinate shift quantity for each individual point on each image display surface on the basis of the above-described equations from the set diopter value and the set interpupillary distance value, together with the number of pixels and field angle, which are values unique to each particular apparatus, and outputs a coordinate shift signal to an image controller 15. On receipt of the coordinate shift signal, the image controller 15 outputs an image signal distorted by the coordinate shift to each of the image display devices 1L and 1R.

The control system may be arranged such that the vergence angle and the coordinate shift quantity correspond stepwisely to the set diopter value and the set interpupillary distance value. The shift quantity determining unit 14 may be arranged to calculate a shift quantity each time the diopter and/or the interpupillary distance is changed. Alternatively, the shift quantity determining unit 14 may be arranged to refer to a look-up table in which shift quantities have previously been determined with respect to set diopter values and set interpupillary distance values in certain ranges.

Figure 7:
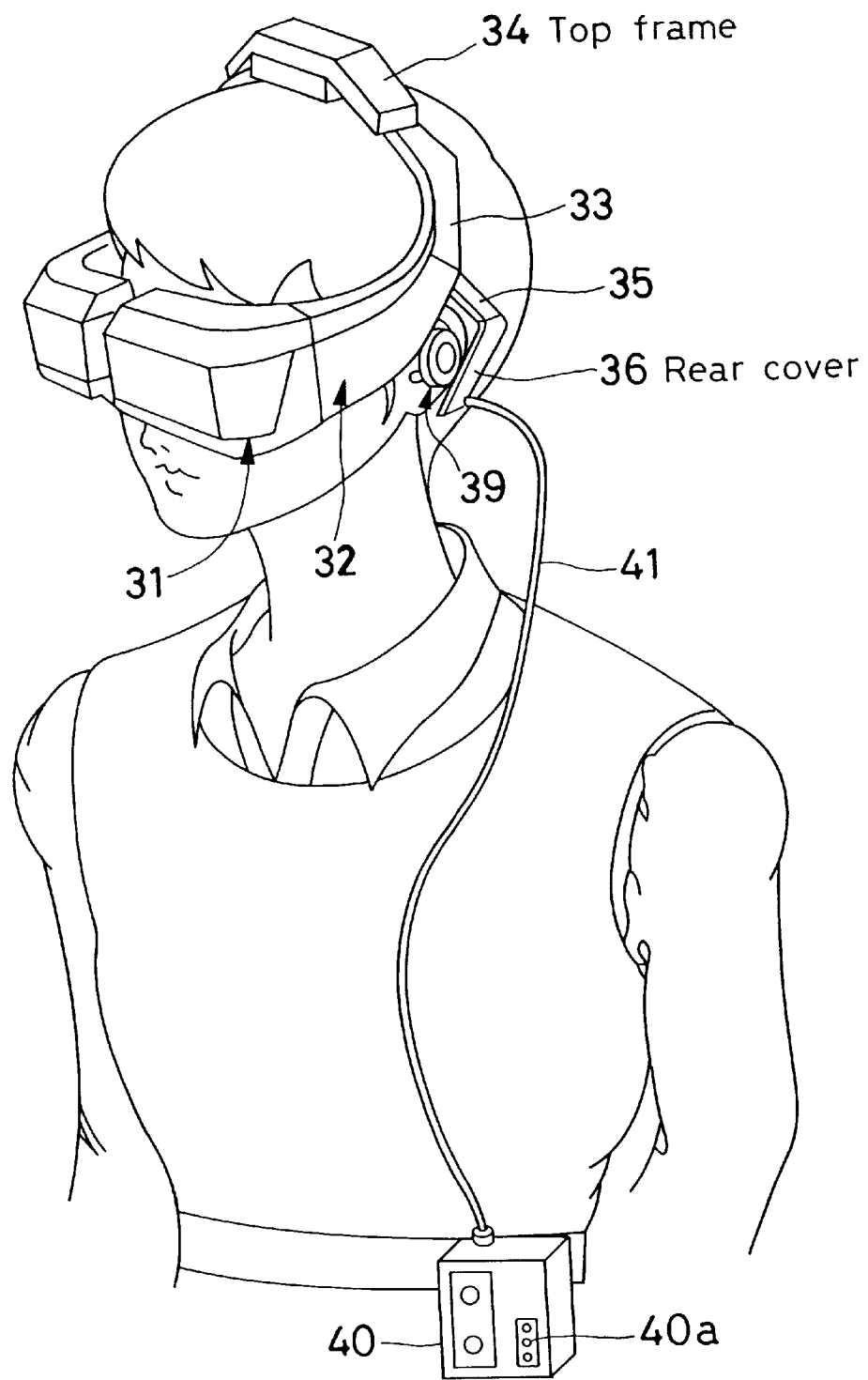
FIG. 7 is a perspective view showing a biocular image display apparatus according to the present invention as fitted to both eyes of an observer.

Incidentally, a biocular image display apparatus such as those described above may be arranged to be fitted to the observer's head or face. FIG. 7 shows such a biocular image display apparatus as fitted to both eyes of an observer. In FIG. 7, a display apparatus body unit 31 is supported by a support member through the observer's head such that the display apparatus body unit 31 is held in front of both the observer's eyes. The support member has a pair of left and right front frames 32 each joined at one end thereof to the display apparatus body unit 31. The left and right front frames 32 extend from the observer's temples to the upper portions of his/her ears, respectively. A pair of left and right rear frames 33 are joined to the other ends of the left and right front frames 32, respectively, and extend over the left and right side portions of the observer's head. The support member further has a top frame 34 joined at both ends thereof to the other ends of the left and right rear frames 33, respectively, such that the top frame 34 supports the top of the observer's head.

A rear plate 35 is joined to one front frame 32 near the joint to the rear frame 33. The rear plate 35 is formed from an elastic member, e.g. a metal leaf spring. A rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. The cable 41 extends through the top frame 34, the rear frames 33, the front frames 32 and the rear plate 35 and projects to the outside from the rear end of the rear plate 35 or the rear cover 36. The cable 41 is connected to a video reproducing unit 40. It should be noted that reference numeral 40a in the figure denotes a switch and volume control part of the video reproducing unit 40.

It should be noted that the cable 41 may have a jack and plug arrangement attached to the distal end thereof so that the cable 41 can be detachably connected to an existing video deck. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the image display apparatus may be arranged to receive external radio signals through an antenna connected thereto.

Figure 8:
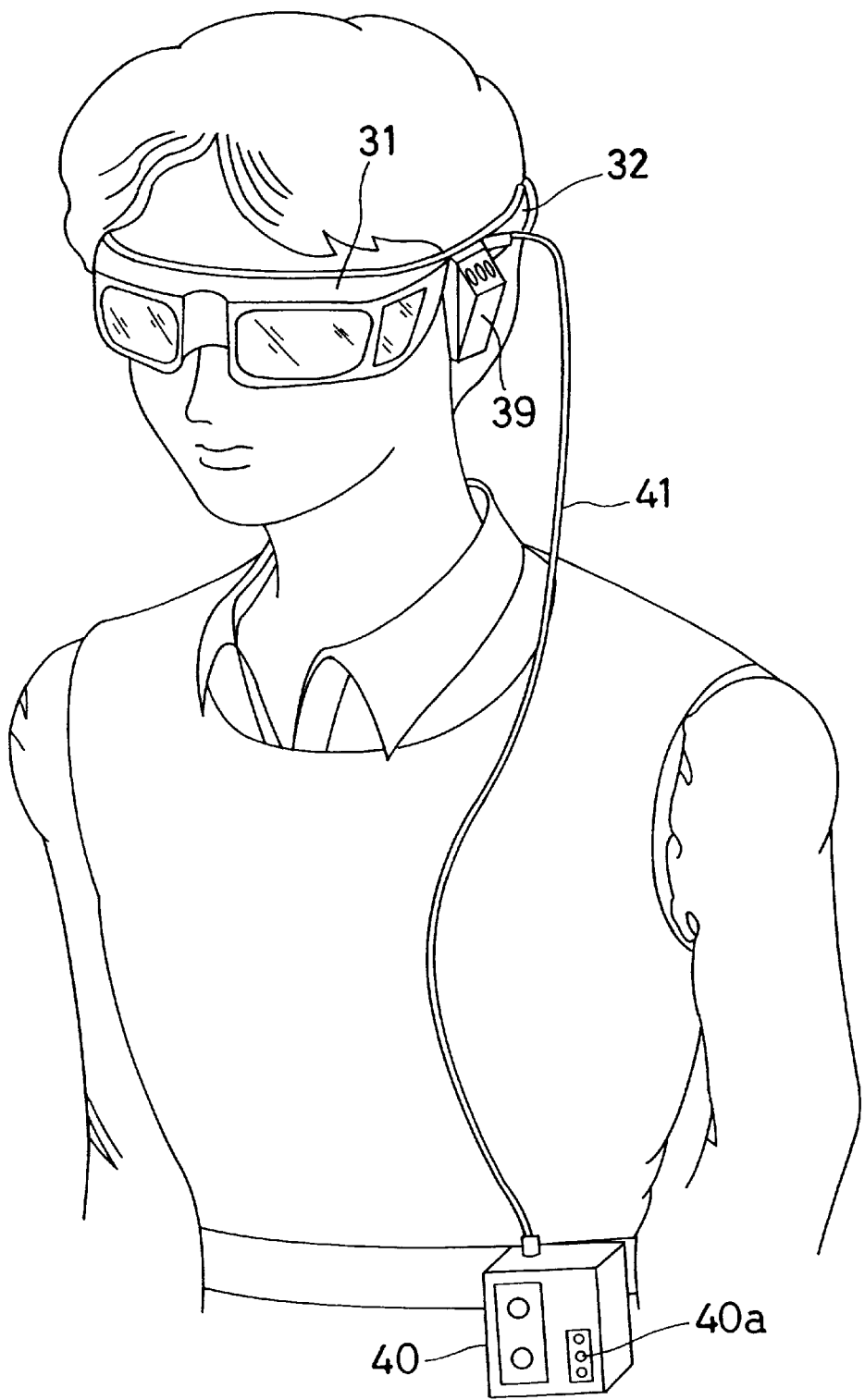
FIG. 8 is a perspective view showing another biocular image display apparatus according to the present invention as fitted to both eyes of an observer.

The face-mounted biocular image display apparatus according to the present invention may also be arranged as shown in FIG. 8. In this type of face-mounted biocular image display apparatus, the top frame 34 and the rear frames 33 are omitted from the arrangement shown in FIG. 7.

Figure 9A:
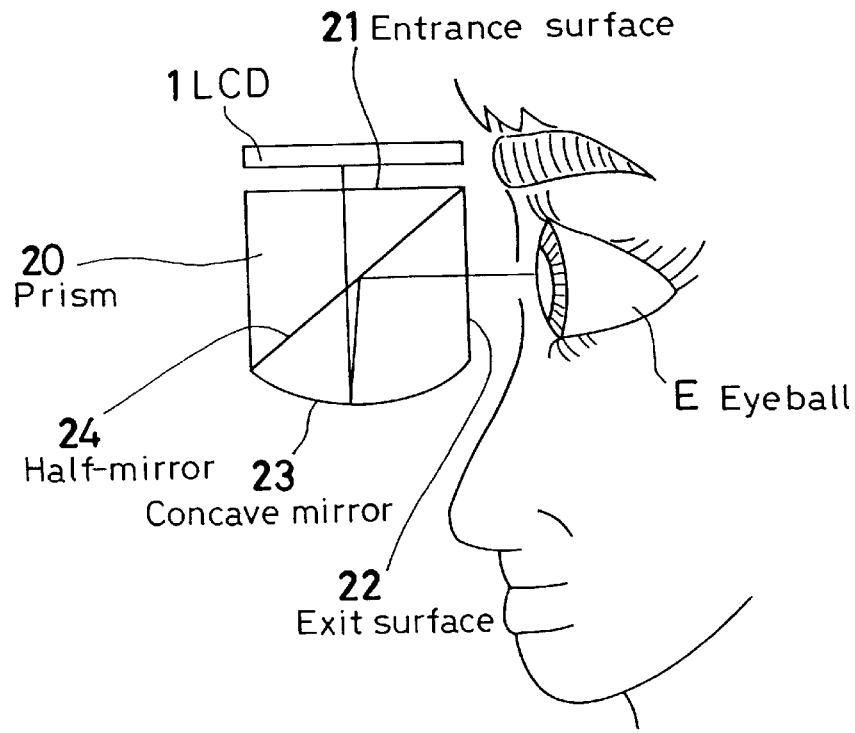
FIGS. 9(a) and 9(b) show modifications of an optical system of the biocular image display apparatus according to the present invention.
Figure 9B:
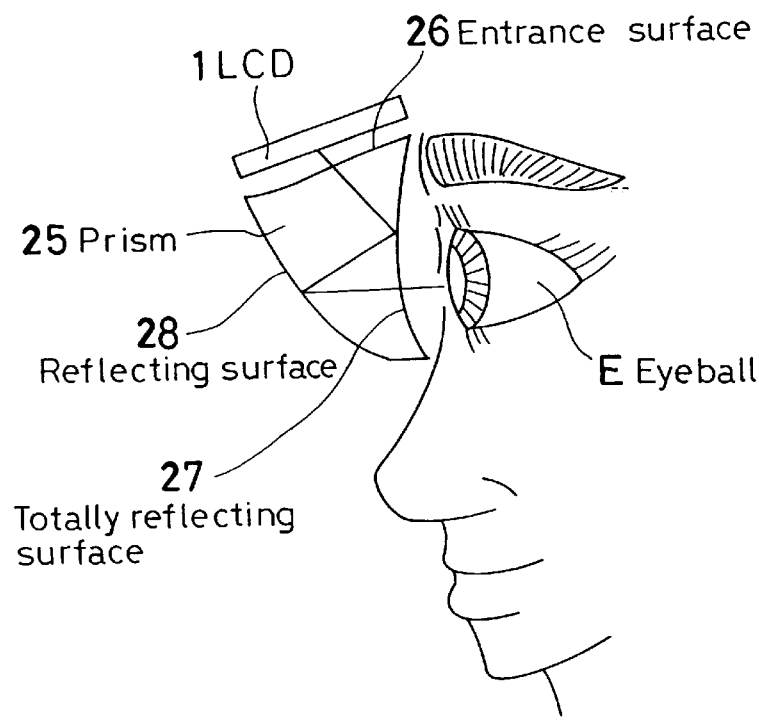
Figure 10:
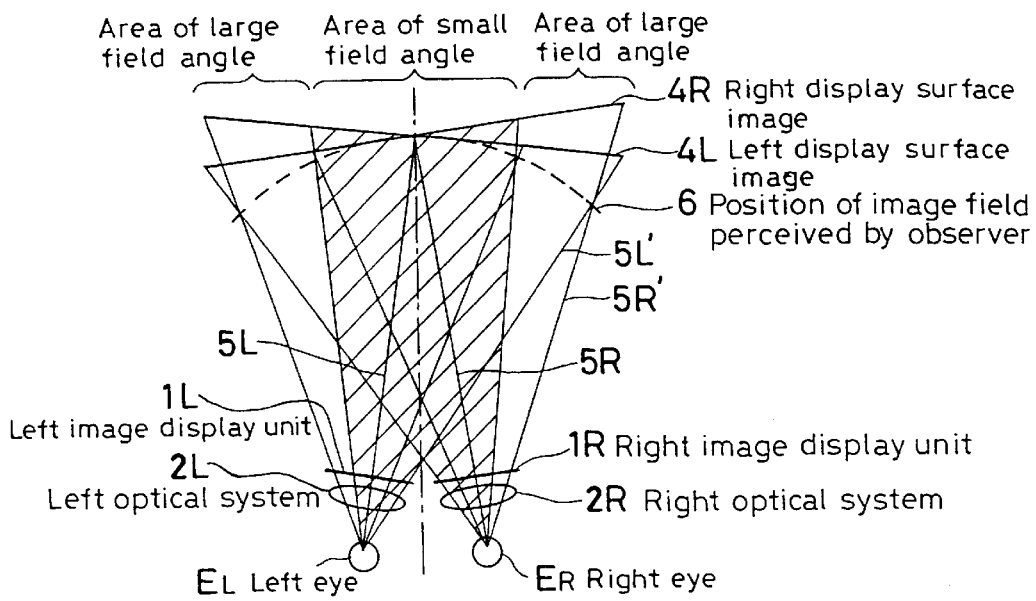
FIG. 10 is a diagram for describing a problem associated with the conventional image display apparatus.
Figure 11:
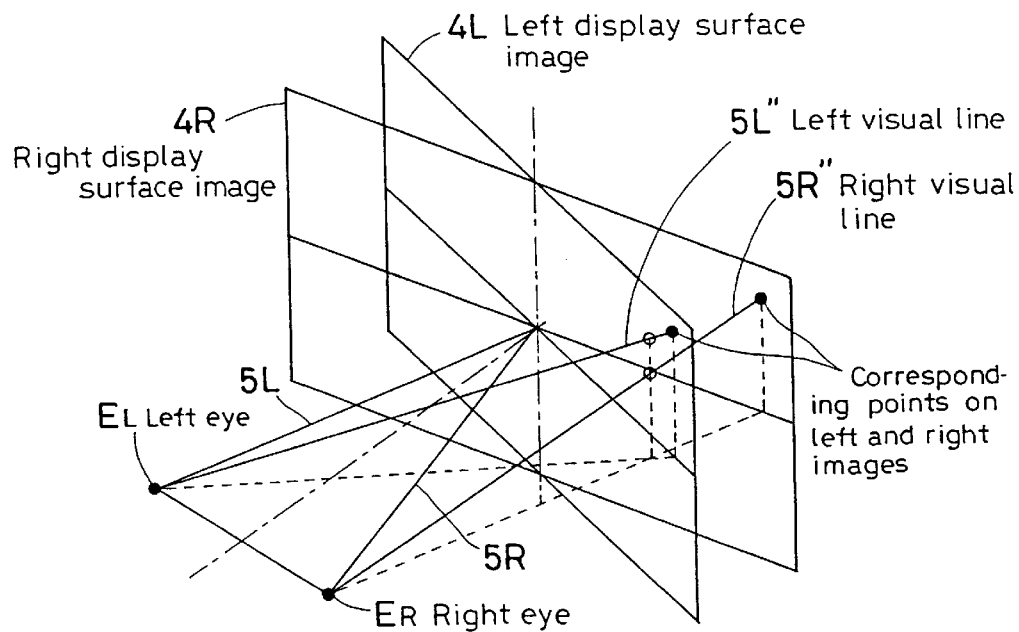
FIG. 11 is a diagram for describing another problem associated with the conventional image display apparatus.

It should be noted that the positional relationship between an image display surface of an LCD (Liquid Crystal Display device), a CRT display or the like used in the present invention and an optical system for leading an image displayed on the image display surface to an eyeball is not necessarily limited to the type as shown in FIG. 1. For example, as shown in FIG. 9(a), a prism 20 may be used as an optical system, in which a folded optical path is formed between a concave mirror 23 and a half-mirror 24. In this case, light rays emitted from an LCD 1 pass through an entrance surface 21 and the half-mirror 24 and are reflected by the concave mirror 23. The reflected light is reflected by the half-mirror 24 and led to an observer's eyeball E. If the optical system is arranged as shown in FIG. 9(a), the optical path can be folded in the prism. Accordingly, the whole apparatus can be made compact in comparison to the arrangement shown in FIG. 1. Further, as shown in FIG. 9(b), a prism 25 formed from decentered surfaces may be used as an optical system. In this case, light rays emitted from an LCD 1 pass through an entrance surface 26 and are then incident on a totally reflecting surface 27 at an angle exceeding the total reflection critical angle. Therefore, the light rays are reflected by the totally reflecting surface 27 and further reflected by a reflecting surface 28. Thereafter, the reflected light rays are incident on the totally reflecting surface 27 at an angle smaller than the total reflection critical angle. Therefore, the incident light rays pass through the totally reflecting surface 27 this time and are led to an observer's eyeball E. With this arrangement of the optical system, the whole apparatus can be made compact by folding the optical path as in the case of the arrangement shown in FIG. 9(a). In addition, because there is no loss of light energy by a half-mirror, it is possible to realize observation of a bright image. Moreover, it is possible to reduce the size and weight of the prism itself.

As will be clear from the foregoing description, the biocular image display apparatus according to the present invention gives a predetermined distortion to each of the left and right images so that the observer's left and right visual lines directed to the corresponding points on the virtual images of the left and right image display surfaces intersect at a predetermined position where the image as observed appears to be natural to the observer, thereby making it possible to prevent the two images from becoming difficult to fuse and also possible to avoid causing the observer to feel incongruity or discomfort.

What we claim is:

1. A biocular image display apparatus, comprising:

a left image display surface for a left eye;

a right image display surface for a right eye:

a left optical system through which an observer's left eye observes an image displayed by said left image display surface as a virtual image for the left eye; and a right optical system through which an observer's right eye observes an image displayed by said right image display surface as a virtual image for the right eye; and an image distorting device that causes said left and right image display surfaces to display said left and right images distorted so that when the observer views said left and right virtual images as a single image by fusing said two images in his/her brain, observer's left and right visual lines can intersect substantially in an ideal virtual image plane, which is a virtual image position ideal for said observer's visual perception, wherein said image distorting device includes a device for distorting the images displayed on said left and right image display surfaces so that both a point of intersection between said observer's left and right visual lines formed when the observer sees the virtual images through images displayed at right-hand edges of said left and right image display surfaces and a point of intersection between said observer's left and right visual lines formed when the observer sees the virtual images through images displayed at left-hand edges of said left and right image display surfaces shift to an ideal virtual image plane containing a point of intersection between observer's left and right visual lines formed when the observer sees the virtual images through images displayed in central portions of said left and right image display surfaces.

2. A biocular image display apparatus according to claim 1, further comprising vergence device having a function of tilting said left and right image display surfaces, together with said left and right optical systems, respectively, as one unit such that optical axes of said left and right optical systems intersect at a predetermined angle according to a diopter value and an interpupillary distance value.

3. A biocular image display apparatus according to claim 1, wherein an optical axis of said left optical system and an optical axis of said right optical system intersect at a predetermined angle so that a diopter and a vergence angle are approximately coincident with each other.

4. A biocular image display apparatus, comprising:

a left image display surface for a left eye;

a right image display surface for a right eye;

a left optical system through which an observer's left eye observes an image displayed by said left image display surface as a virtual image for the left eye; and a right optical system through which an observer's right eye observes an image displayed by said right image display surface as a virtual image for the right eye; and an image distorting device that causes said left and right image display surfaces to display said left and right images distorted so that when the observer views said left and right virtual images as a single image by fusing said two images in his/her brain, observer's left and right visual lines can intersect substantially in an ideal virtual image plane, which is a virtual image position ideal for said observer's visual perception wherein said image distorting means is arranged to distort the images displayed on said left and right image display surfaces by compression or expansion such that a left-hand marginal image displayed on said left image display surface is expanded in a vertical direction, and/or a right-hand marginal image displayed on said left image display surface is compressed in a vertical direction, and/or a right-hand marginal image displayed on said right image display surface is expanded in a vertical direction, and/or a left-hand marginal image displayed on said right image display surface is compressed in a vertical direction.

5. A biocular image display apparatus, comprising:

a left image display surface for a left eye;

a right image display surface for a right eye;

a left optical system through which an observer's left eye observes an image displayed by said left image display surface as a virtual image for the left eye; and a right optical system through which an observer's right eye observes an image displayed by said right image display surface as a virtual image for the right eye; and an image distorting device that causes said left and right image display surfaces to display said left and right images distorted so that when the observer views said left and right virtual images as a single image by fusing said two images in his/her brain, observer's left and right visual lines can intersect substantially in an ideal virtual image plane, which is a virtual image position ideal for said observer's visual perception, wherein said image distorting device is arranged to distort the images displayed on said left and right image display surfaces by compression or expansion such that a left-hand marginal image displayed on said left image display surface moves outwardly to a leftward image position, and/or a right-hand marginal image displayed on said left image display surface moves inwardly to a leftward image position, and/or a right-hand marginal image displayed on said right image display surface moves outwardly to a rightward image position, and/or a left-hand marginal image displayed on said right image display surface moves inwardly to a rightward image position.

6. A biocular image display apparatus according to claim 5 or 4, wherein an optical axis of said left optical system and an optical axis of said right optical system intersect at a predetermined angle according to a diopter value and an interpupillary distance value.

7. A biocular image display apparatus according to claim 6, wherein said image distorting device is formed such that the expansion or compression of said images is effected by changing coordinates defining a position of each image point displayed on each of said image display surfaces, and a change of said coordinates is decided from the coordinates of each image point position, a number of pixels of each of said image display surfaces, a field angle of said biocular image display apparatus, and an angle of intersection between the optical axes of said left and right optical systems.

8. A biocular image display apparatus according to claim 1, wherein an optical axis of said left optical system and an optical axis of said right optical system intersect at a predetermined angle according to a diopter value and an interpupillary distance value.

* * * * *